(12) United States Patent
Sunayama et al.

(10) Patent No.: US 7,603,545 B2
(45) Date of Patent: Oct. 13, 2009

(54) INSTRUCTION CONTROL METHOD AND PROCESSOR TO PROCESS INSTRUCTIONS BY OUT-OF-ORDER PROCESSING USING DELAY INSTRUCTIONS FOR BRANCHING

(75) Inventors: Ryuichi Sunayama, Kawasaki (JP); Aiichiro Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 370 days.

(21) Appl. No.: 10/345,296

(22) Filed: Jan. 16, 2003

(65) Prior Publication Data
US 2004/0003214 A1 Jan. 1, 2004

(30) Foreign Application Priority Data
Jun. 28, 2002 (JP) .............................. 2002-190556

(51) Int. Cl.
G06F 7/38 (2006.01)
G06F 9/00 (2006.01)
G06F 9/44 (2006.01)
(52) U.S. Cl. .......................................... 712/234; 712/35
(58) Field of Classification Search .................. 712/233, 712/234, 35
See application file for complete search history.

(56) References Cited

U.S. PATENT DOCUMENTS 5,265,213 A 11/1993 Weiser et al.

6,883,090 B2 * 4/2005 Kruckemyer ................ 712/233

FOREIGN PATENT DOCUMENTS

| JP | 3-122718 | 5/1991 |
| JP | 4-213727 | 8/1992 |
| JP | 6-110683 | 4/1994 |
| JP | 7-93151  | 4/1995 |

OTHER PUBLICATIONS

Computer Organization and Design The Hardware/Software Interface David A. Patterson and John L. Hennessy 1998 Morgan Kaufmann Publishers, Inc.*
The SPARC Architecture Manual Version 8 Revision SAV080SI9308 1992.*
The SPARC Architecture Manual Version 8 Revision SAV080SI9308 1992; pp. 13 and 14.*
Japanese Office Action dated Jan. 24, 2006 of Japanese Application No. 2002-190556.

* cited by examiner

*Primary Examiner*—Niketa I Patel
*Assistant Examiner*—Jesse R Moll
(74) *Attorney, Agent, or Firm*—Staas & Halsey LLP

(57) ABSTRACT

An instruction control method carries out an instruction in a processor to process instructions by out-of-order processing, using delay instructions for branching. The processor includes a storage unit, a branch predictor making branch predictions and a control unit which successively stores a plurality of delay instructions in the storage unit together with information indicating whether or not branch instructions corresponding to the delay instructions are predicted to branch by the branch predictor.

23 Claims, 11 Drawing Sheets

INSTRUCTION CONTROL METHOD AND PROCESSOR TO PROCESS INSTRUCTIONS BY OUT-OF-ORDER PROCESSING USING DELAY INSTRUCTIONS FOR BRANCHING

BACKGROUND OF THE INVENTION

This application claims the benefit of a Japanese Patent Application No. 2002-190556 filed Jun. 28, 2002, in the Japanese Patent Office, the disclosure of which is hereby incorporated by reference.

1. Field of the Invention

The present invention generally relates to instruction control methods and processors, and more particularly to an instruction control method for processing a plurality of instructions including branch instructions at a high speed in an instruction control which involves branch prediction and delay instructions for branching, and to a processor which employs such an instruction control method.

2. Description of the Related Art

Recently, various instruction processing methods are employed in order to improve the performance of the processor. An out-of-order processing method is one of such instruction processing methods. In the processor which employs the out-of-order processing method, a completion of one instruction execution is not waited and subsequent instructions are successively inserted into a plurality of pipelines to execute the instructions, so as to improve the performance of the processor.

However, in a case where execution of a preceding instruction affects execution of a subsequent instruction, the subsequent instruction cannot be executed unless the execution of the preceding instruction us completed. If the processing of the preceding instruction which affects the execution of the subsequent instruction is slow, the subsequent instruction cannot be executed during the processing of the preceding instruction, and the subsequent instruction must wait for the completion of the execution of the preceding instruction. As a result, the pipeline is disturbed, and the performance of the processor deteriorates. Such a disturbance in the pipeline is particularly notable in the case of a branch instruction.

The branch instructions include conditional branch instructions. In the case of the conditional branch instruction, if an instruction exists which changes the branch condition (normally, a condition code) immediately prior to the conditional branch instruction, the branch does not become definite until this instruction is completed. Accordingly, because the sequence subsequent to the branch instruction is unknown, the subsequent instructions cannot be executed, and the process stops to thereby deteriorate the processing capability. This phenomenon is not limited to the processor employing the out-of-order processing method, and a similar phenomenon occurs in the case of processors employing processing methods such as a lock step pipeline processing method. However, the performance deterioration is particularly notable in the case of the processor employing the out-of-order processing method. Hence, in order to suppress the performance deterioration caused by the branch instruction, a branch prediction mechanism is normally provided in an instruction control unit within the processor. The branch prediction mechanism predicts the branching, so as to execute the branch instruction at a high speed.

When using the branch prediction mechanism, the subsequent instruction and the instruction at the branching destination are executed in advance, before judging whether or not a branch occurs when executing the branch instruction. If the branching occurs as a result of executing the branch instruction, the branch prediction mechanism registers therein a pair of instruction address at the branching destination and an instruction address of the branch instruction itself. When the instruction is read from a main storage within the processor in order to execute the instruction, the registered instruction addresses registered within the branch prediction mechanism are searched prior to executing the instruction. By providing the branch prediction mechanism and predicting the branching, the instruction control unit can fetch the instructions from the main storage and successively execute the instructions while minimizing delay of the instructions.

A problem occurs when an instruction control method which is employed by the processor uses delay instructions for branching. In this case, the branch instruction is executed in the following manner. For example, if an instruction sequence is a1, a2, a3, a4, a5, a6, a3 is a conditional branch instruction and a4 is a delay instruction, the instructions are executed in a sequence a1, a2, a3, a4, b1, b2 if the conditional branch instruction a3 branches, and are executed in a sequence a1, a2, a3, a5, a6 if the conditional branch instruction a3 does not branch, where b1 is an instruction at the branching destination.

According to the prior art, branch information indicating whether or not a branch instruction at an arbitrary instruction address has branched in the past is registered, and the instruction address of the branch instruction, the instruction address at the branching destination when branching or the instruction address which is executed next when not branching are paired with the branch information and registered therewith. The registered branch information and instruction. address pair is used to predict whether or not the branch instruction branches. However, in either case where the branch instruction branches and the branch instruction does not branch, the pair of branch information and instruction address must be registered, and there was a problem in that a large storage capacity is required for the instruction control.

In addition, when the prediction of the branching fails, and particularly when the branch instruction which could not be predicted is decoded, it is always necessary to temporarily stop executing the subsequent instructions until the branch condition of the branch instruction becomes definite and the judgement is made on the branch, regardless of whether or not the branch instruction branches. As a result, the entire process flow of the instruction process within the processor is stopped temporarily, and there was a problem in that the performance of the processor greatly deteriorates.

SUMMARY OF THE INVENTION

Accordingly, it is a general object of the preset invention to provide a novel and useful instruction control method and processor, in which the problems described above are eliminated.

Another and more specific object of the present invention is to provide an instruction control method and a processor, which do not require a large storage capacity for the instruction control, and suppresses temporary stopping of the entire process flow of the instruction process within the processor, so as to positively prevent the performance of the processor from deteriorating.

Still another object of the present invention is to provide an instruction control method which uses delay instructions for branching, comprising successively storing a plurality of delay instructions in a storage unit together with information indicating whether or not branch instructions corresponding to the delay instructions are predicted to branch. According to the instruction control method of the present invention, it is unnecessary to provide a large storage capacity for the instruction control, and it is possible to suppresses temporary stopping of the entire process flow of the instruction process within the processor, so as to positively prevent the performance of the processor from deteriorating.

A further object of the present invention is to provide an instruction control method which uses delay instructions for branching, comprising making a branch prediction; issuing an instruction by reading a corresponding delay instruction from the storage unit together with an instruction fetch request at a branching destination in a case where branching of an immediately preceding branch instruction becomes definite after issuing an instruction by temporarily replacing a delay instruction by a non-operation instruction when a corresponding branch instruction is predicted not to branch; and continuing execution of the instruction if an instruction at the predicted branching destination is issued and the predicted branching destination is correct and making an instruction refetch request of a branching destination instruction after the delay instruction if predicted branching destination is incorrect, after the branch instruction is predicted to branch and the corresponding delay instruction is issued. According to the instruction control method of the present invention, it is unnecessary to provide a large storage capacity for the instruction control, and it is possible to suppresses temporary stopping of the entire process flow of the instruction process within the processor, so as to positively prevent the performance of the processor from deteriorating.

Another object of the present invention is to provide an instruction control method which uses delay instructions for branching, comprising making a branch prediction; continuing execution of an instruction if no branching of an immediately preceding branch instruction becomes definite after no branching of a branch instruction is predicted and the instruction is issued by temporarily replacing a delay instruction by a non-operation instruction; and issuing the instruction immediately after a fetch is completed by making an instruction refetch request of an original sequential instruction if no branching of the branch instruction becomes definite after branching of the branch instruction is predicted. According to the instruction control method of the present invention, it is unnecessary to provide a large storage capacity for the instruction control, and it is possible to suppresses temporary stopping of the entire process flow of the instruction process within the processor, so as to positively prevent the performance of the processor from deteriorating.

Still another object of the present invention is to provide a processor which carries out an instruction control using delay instructions for branching, comprising a storage unit; a branch predictor making branch predictions; and a control unit successively storing a plurality of delay instructions in the storage unit together with information indicating whether or not branch instructions corresponding to the delay instructions are predicted to branch by the branch predictor. According to the processor of the present invention, it is unnecessary to provide a large storage capacity for the instruction control, and it is possible to suppresses temporary stopping of the entire process flow of the instruction process within the processor, so as to positively prevent the performance of the processor from deteriorating.

A further object of the present invention is to provide a processor which carries out an instruction control using delay instructions for branching, comprising a storage unit; a branch predictor making branch predictions; and a control unit issuing an instruction by reading a corresponding delay instruction from the storage unit together with an instruction fetch request at a branching destination in a case where branching of an immediately preceding branch instruction becomes definite after issuing an instruction by temporarily replacing a delay instruction by a non-operation instruction when a corresponding branch instruction is predicted not to branch, and continuing execution of the instruction if an instruction at the predicted branching destination is issued and the predicted branching destination is correct and making an instruction refetch request of a branching destination instruction after the delay instruction if predicted branching destination is incorrect, after the branch instruction is predicted to branch and the corresponding delay instruction is issued. According to the processor of the present invention, it is unnecessary to provide a large storage capacity for the instruction control, and it is possible to suppresses temporary stopping of the entire process flow of the instruction process within the processor, so as to positively prevent the performance of the processor from deteriorating.

A further object of the present invention is to provide a processor which carries out an instruction control using delay instructions for branching, comprising a branch predictor making branch predictions; and a control unit continuing execution of an instruction if no branching of an immediately preceding branch instruction becomes definite after no branching of a branch instruction is predicted and the instruction is issued by temporarily replacing a delay instruction by a non-operation instruction, and issuing the instruction immediately after a fetch is completed by making an instruction refetch request of an original sequential instruction if no branching of the branch instruction becomes definite after branching of the branch instruction is predicted. According to the processor of the present invention, it is unnecessary to provide a large storage capacity for the instruction control, and it is possible to suppresses temporary stopping of the entire process flow of the instruction process within the processor, so as to positively prevent the performance of the processor from deteriorating.

Other objects and further features of the present invention will be apparent from the following detailed description when read in conjunction with the accompanying drawings.

DESCRIPTION OF THE PREFERRED EMBODIMENTS

Figure 1:
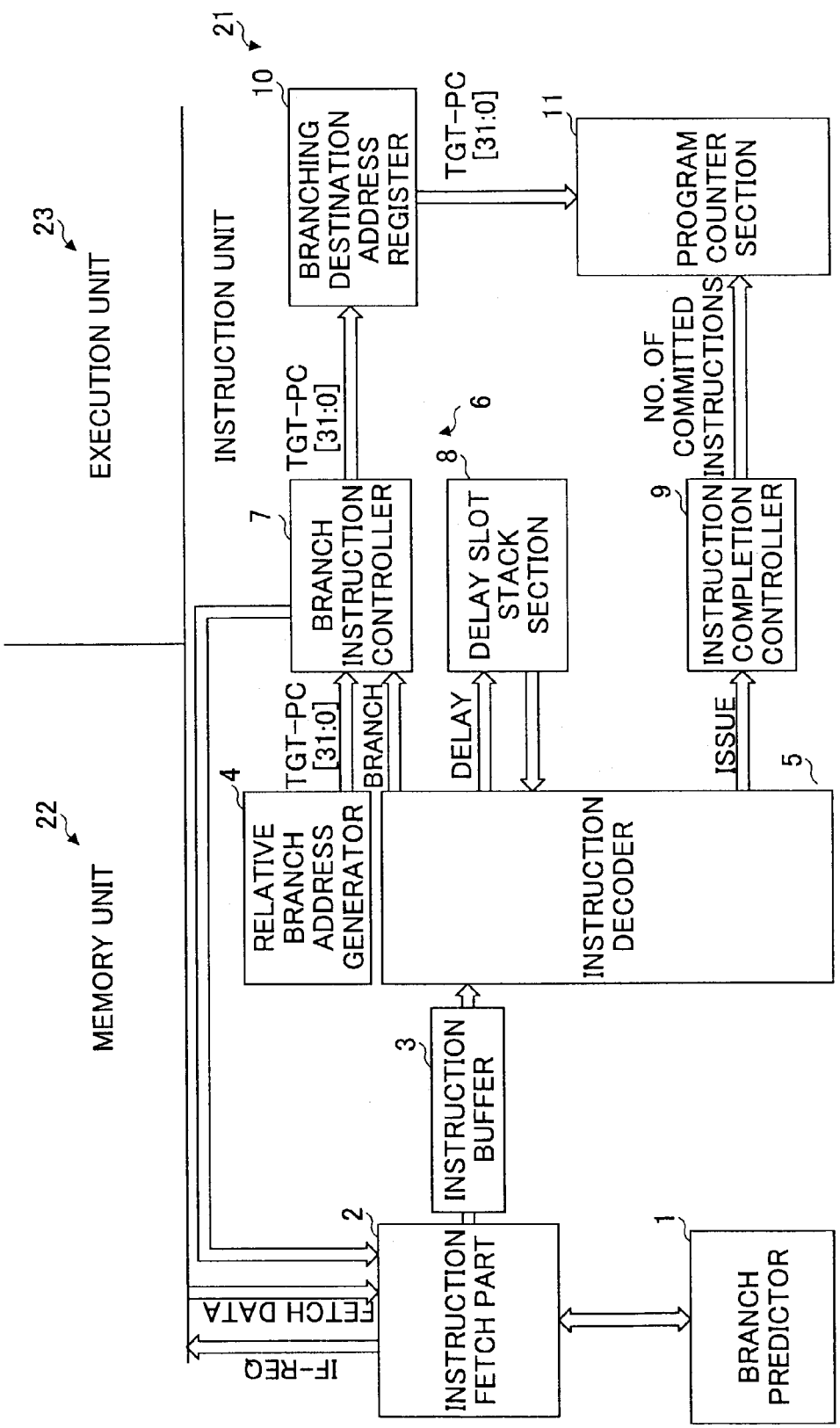
FIG. 1 is a system block diagram showing an embodiment of a processor according to the present invention.

First, a description will be given of the operating principle of the present invention.

In the present invention, a storage mechanism which temporarily stores delay instructions for branching in a manner readable at any time, is provided within an instruction control unit of a processor. When storing the delay instruction, the delay instruction is stored together with tag information which indicates a branch instruction to which the stored delay instruction corresponds. In the present invention, a branch instruction for which a branching occurs is registered in a branch predicting part, but a branch instruction for which a branching does not occur is not registered. In other words, instruction at a branching destination is prefetched with respect to a branch instruction which branched in the past, but a sequential instruction fetch is made as is when no branch prediction is carried out, so as to insert the instructions into an executing pipeline.

However, the delay instruction of the branch instruction will also be inserted into the executing pipeline unless something is done. Hence, if a branch instruction which could not be predicted by the branch prediction is issued and an annul bit is "1", a corresponding delay instruction is temporarily stored in a delay instruction storage mechanism which is newly provided, and a non-operation instruction is inserted into the executing pipeline in place of the delay instruction. When the branch condition becomes definite and the branch instruction does not branch, the instruction process is continued as is (that is, the branch prediction became true). In this state, the delay instruction of the corresponding branch instruction is removed from the entry.

When making the branch, a fetch request for an instruction at the branching destination is made at a time when the branch condition and the branching destination address become definite. And when the branch instruction is completed, the other instructions being executed are cleared from the executing pipeline, and the delay instruction of the branch instruction is obtained and inserted into the executing pipeline. After issuing the delay instruction, the instruction at the branching destination is inserted into the executing pipeline. When the delay instruction is issued, this delay instruction is removed from the entry. If the branch prediction is made, the instruction at the predicted branching destination is inserted into the executing pipeline after inserting the delay instruction corresponding to the predicted branch instruction. In this case, the delay instruction is not stored.

When the branch condition becomes definite and the branching is made, the instruction is executed as is if the predicted address at the branching destination is correct. On the other hand, if the branching is made but the address at the branching destination is incorrect, a refetch request (instruction refetch request) for the instruction at the branching destination is made at a time when the address at the branching destination becomes definite, and the instruction at the branching destination is inserted into the executing pipeline after inserting the delay instruction into the executing pipeline. In a case where the branch prediction is made and the branch condition becomes definite but no branching is made, the instruction refetch request is made for a subsequent instruction at a time when the judgement is made on the branch. When the branch instruction is completed, the executing pipeline is cleared, and the subsequent instruction is thereafter inserted into the executing pipeline.

In the present invention, when the branch prediction fails, that is, for the following three cases 1) through 3), the instruction refetch is required, but this is also the case for the conventional instruction control method.

1) The branch prediction is made but no branch is made.
2) The branch prediction is made but the address at the branching destination is incorrect.
3) The branch prediction cannot be made but the branching is made.

However, for all other cases, the present invention can carry out the instruction process without stopping the process flow of the instruction fetch and the executing pipeline, and for this reason, it is possible to carry out the instruction process at a high speed.

Next, a description will be given of various embodiments of an instruction control method according to the present invention and a processor according to the present invention, by referring to the drawings.

FIG. 1 is a system block diagram showing an embodiment of the processor according to the present invention. A processor 100 shown in FIG. 1 includes an instruction unit 21, a memory unit 22, and an execution unit 23. The instruction unit 21 forms an instruction control unit which employs an embodiment of the instruction control method according to the present invention. The memory unit 22 is provided to store instructions, data and the like. The execution unit 23 is provided to carry out various operations (computations).

The instruction unit 21 includes a branch predicting part 1, an instruction fetch part 2, an instruction buffer 3, a relative branch address generator 4, an instruction decoder 5, a branch instruction executing part 6, an instruction completion controller 9, a branching destination address register 10, and a program counter section 11 which are connected as shown in FIG. 1. The branch instruction executing part 6 includes a branch instruction controller 7 and a delay slot stack section 8. The program counter section 11 includes a program counter (PC) and a next program counter (nPC).

The branch instructions can be controlled independently in the branch predicting part 1, the branch instruction controller 7, the instruction completion controller 9 and the branching destination address register 10. When the branch instruction existing in the executing pipeline is decoded by the instruction decoder 5, the branch instruction temporarily becomes under control of the branch instruction controller 7. The branch instruction controller 7 judges the branch condition of the branch instruction and whether the branch prediction became true or failed, and also controls the instruction refetch. The number of branch instructions controllable by the branch instruction controller 7 is determined by the number of entries. The branch instruction controller 7 carries out the control up to when the branch condition of the branch instruction becomes definite and when the branching destination address is generated, and the control is thereafter carried out by the instruction completion controller 9. The branching destination address register 10 controls the branching destination address of the branching branch instruction which is released from the control of the branch instruction controller 7. The branching destination address register 10 carries out the control up to the completion of the instruction, that is, the updating of the program counter section 11. The instruction completion controller 9 controls the instruction completion condition of all of the instructions, and the branch instruction is controlled thereby regardless of whether the branching is made.

The branching destination address generation can be categorized into two kinds, namely, one for the instruction relative branching and another for the register relative branching. The branching destination address for the instruction relative branching is calculated in the relative branch address generator 4, and is supplied to the branching destination address register 10 via the branch instruction controller 7. The branching destination address for the register relative branching is calculated in the execution unit 23, and is supplied to the branching destination address register 10 via the branch instruction controller 7. For example, the lower 32 bits of the branching destination address for the register relative branching are supplied to the program counter section 11 via the branch instruction controller 7, and the upper 32 bits are supplied directly to the program counter section 11. The branching destination address of the register relative branching is calculated based on existence of a borrow bit and a carry bit when the upper 32 bits of the instruction address change, and thus, the branching destination instruction address is controlled by [(lower 32 bits)+(4-bit parity)+(borrow bit)+(carry bit)]×(number of entries) in the branch instruction controller 7. Similarly, the branching destination instruction address is controlled by [(lower 32 bits)+(4-bit parity)+(borrow bit)+(carry bit)]×(number of entries) in the branching destination address register 10. When the upper 32 bits of the instruction address change, the value is once set in the instruction buffer 3, before making an instruction fetch by a retry from the program counter section 11.

The control for updating the resources used is carried out by the instruction completion controller 9 and the program counter section 11. In the case of the program counter section 11, information indicating how may instructions were committed simultaneously and whether an instruction which branches was committed is supplied. In the case where the instruction which branches is committed, the information indicating this is also supplied to the branch instruction controller 7. In this embodiment, PC=nPC+{number of simultaneously committed instructions)−1}×4, nPC=nPC+{(number of simultaneously committed instructions)×4} or the branching destination address is supplied as the information. In this embodiment, the branching instruction which branches may be committed simultaneously with a preceding instruction, but may not be committed simultaneously with a subsequent instruction. This is because, a path of the branching destination address is not inserted in a path for setting the program counter PC. If the path of the branching destination address is inserted for the program counter PC, similarly to the case of the next program counter nPC, the restriction regarding the number of simultaneously committed branching instructions can be eliminated. With respect to the branch instruction which does not branch, there is no restriction in this embodiment regarding the number of simultaneously committed branching instructions. When the branch instruction is committed in this embodiment, there is no restriction regarding the committing position and there is no restriction at the time of the decoding.

Figure 2:
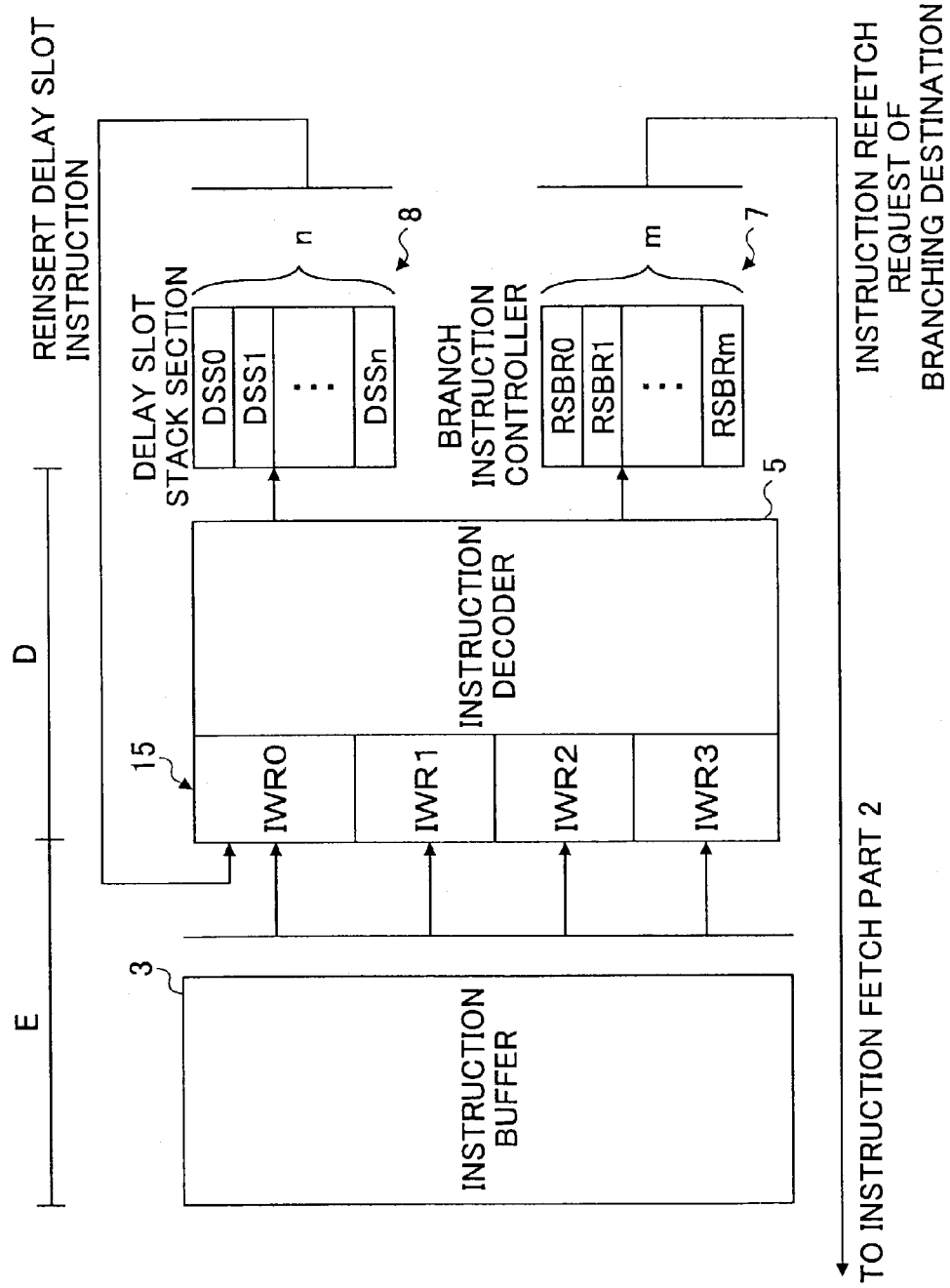
FIG. 2 is a system block diagram showing an important part of an instruction unit.

FIG. 2 is a system block diagram showing an important part of the instruction unit 21 shown in FIG. 1. In FIG. 2, those parts which are the same as those corresponding parts in FIG. 1 are designated by the same reference numerals, and a description thereof will be omitted. In FIG. 2, the instruction decoder 5 includes a register section 15 which is made up of instruction word registers IWR0 through IWR3. The branch instruction controller 7 includes m reservation stations for branch (RSBRs) RSBR0 through RSBRm. The delay slot stack section 8 includes n delay slot stacks (DSSs) DSS0 through DSSn, which may be formed by various kinds of storage units. An upper portion of FIG. 2 shows an interval (cycle) E in which a predecoding is carried out, and an interval (cycle) D in which a decoding is carried out.

In this embodiment, it is assumed for the sake of convenience that the processor employs a SPARC architecture. The instructions are processed by out-of-order processing, and the plurality of reservation stations for branch RSBR0 through RSBRm and the plurality of delay slot stacks DSS0 through DSSn are provided in the branch instruction executing part 6, as described above. In addition, the branch predictor 1 is provided as a branch instruction prediction mechanism.

When an instruction fetch request is issued from the instruction fetch part 2, the branch predictor 1 makes a branch prediction with respect to an instruction address requested by the instruction fetch request. In a case where an entry corresponding to the instruction address requested by the instruction fetch request exists in the branch predictor 1, a flag BRHIS_HIT which indicates that the branch prediction is made is added to a corresponding instruction fetch data, and the instruction fetch request of the branching instruction address predicted by the branch prediction is output to the instruction fetch part 2. The instruction fetch data is supplied from the instruction fetch part 2 to the instruction decoder 5 together with the added flag BRHIS_HIT. The instruction is decoded in the instruction decoder 5, and in a case where the instruction is a branch instruction such as BPr, Bicc, BPcc, FBcc and FBPcc having the annul bit, a reference is made to the annul bit together with the flag BRHIS_HIT.

If the flag BRHIS_HIT=1, the instruction decoder 5 executes one subsequent instruction unconditionally. But if the flag BRHIS_HIT=0 and the annul bit is "1", the instruction decoder 5 carries out the decoding by making one subsequent instruction a non-operation (NOP) instruction. In other words, the instruction decoder 5 carries out the normal decoding if the flag BRHIS_HIT=1, but if the decoded result is a branch instruction, the flag BRHIS_HIT=0 and the annul bit is "1", the instruction decoder 5 changes the one subsequent instruction to the NOP instruction. In the SPARC architecture, a branch instruction having the annul bit executes a delay slot instruction (delay instruction) in the case where the branch occurs, and does not execute the delay slot instruction in the case where the branch does not occur and the annul bit is "1" and executes the delay slot instruction only in the case where the annul bit is "0". Making the branch prediction means that the instruction is a branch instruction and that the branching is predicted, and thus, executing a delay slot instruction is substantially the same as predicting. Instructions such as CALL, JMPL and RETURN which do not have an annul bit are unconditional branches, and always execute a delay slot instruction, thereby making it possible to treat these instructions similarly to the above. An instruction ALWAYS_BRANCH which is COND=1000 does not execute a delay slot instruction when the annul bit is "1" even though this instruction is an unconditional branch, but such a case does not occur frequently, and can thus be recovered by an instruction refetch.

When the branch prediction is made, it is unnecessary to make the instruction refetch if the branch prediction is true, and the instruction sequence at the predicted branching destination is the same as the actual instruction sequence. In addition, if the branch prediction is true, it means that the delay slot instruction is also executed correctly, and for this reason, the execution of the instructions is continued in this state.

On the other hand, if the branch prediction is made and the branch prediction does not become true, an instruction refetch is required. In this case, an erroneous instruction sequence is executed at the branching destination, and it is necessary to reexecute the actual instruction sequence. In addition, the execution of the delay slot instruction is also in error in this case, and the reexecution of the instructions is required from the delay slot instruction. In this embodiment, after the instruction refetch request of the branching destination is output from the branch instruction controller 8 to the instruction fetch part 2, the delay slot instruction to be reexecuted is obtained from the delay slot stack section 8, and the delay slot instruction is supplied to the instruction decoder 5. Hence, the recovery of the branch prediction, including the delay slot instruction, is made.

Figure 3:
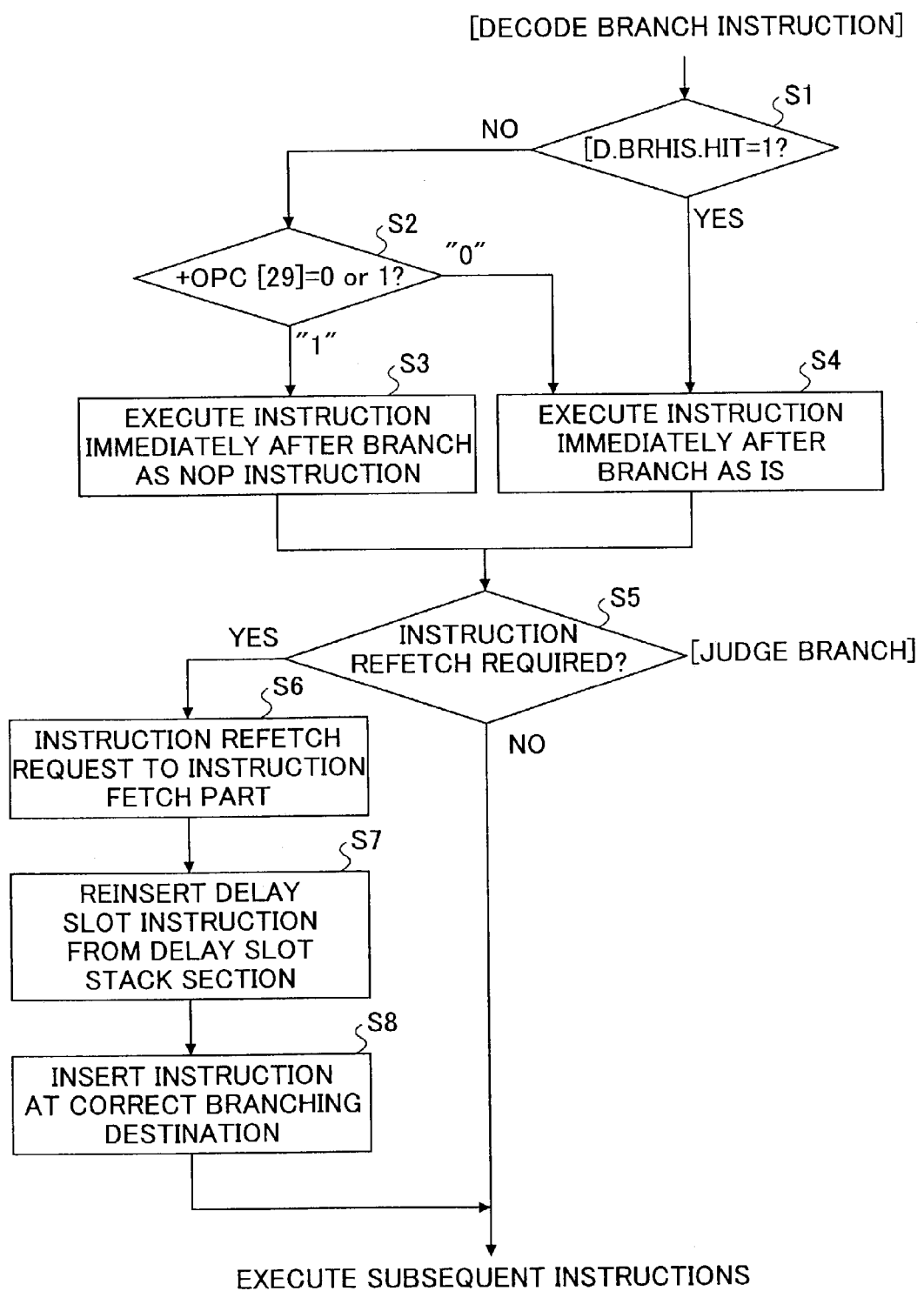
FIG. 3 is a flow chart for explaining an operation of an important part of the instruction unit.
Figure 4:
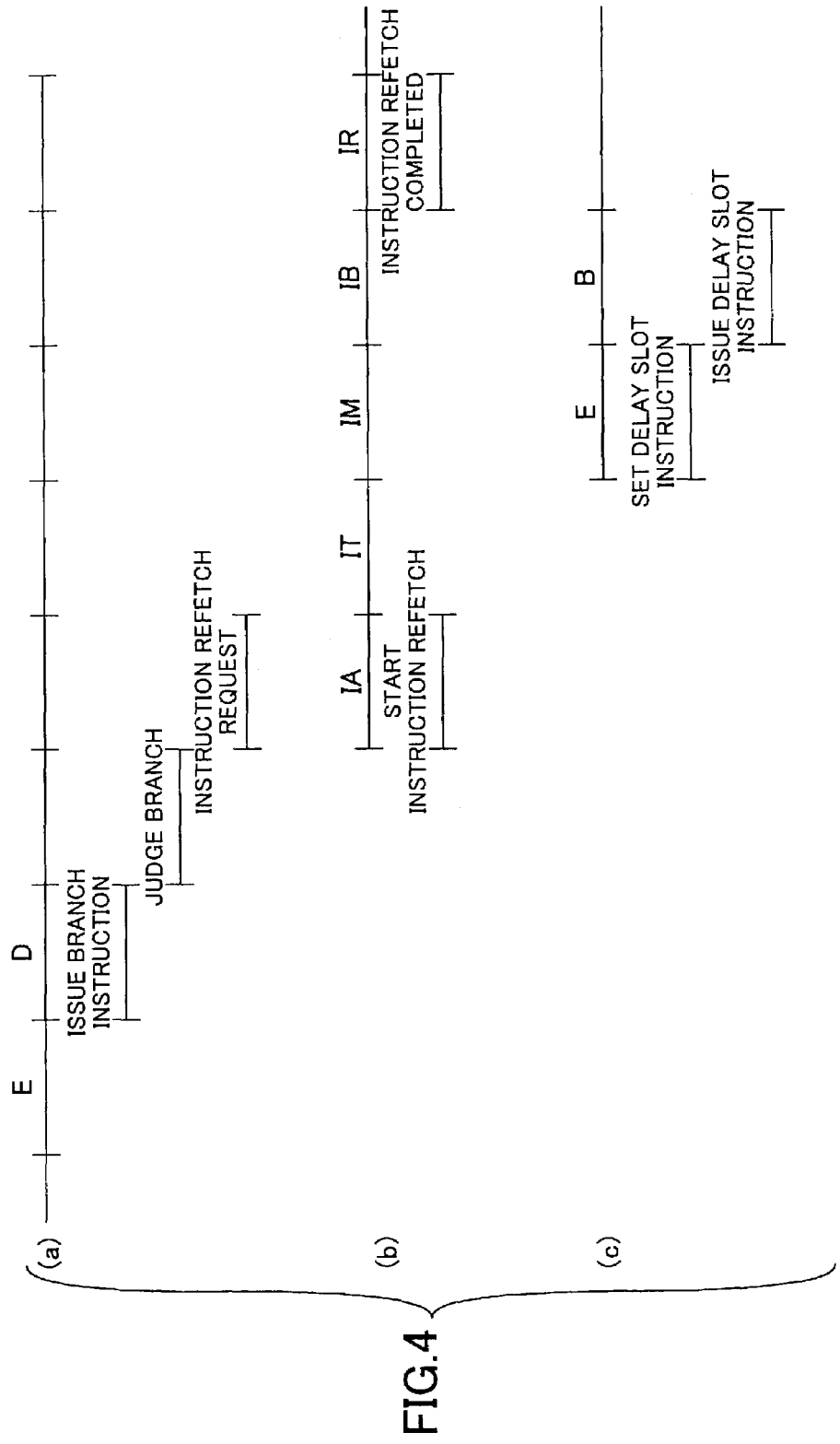
FIG. 4(a) through 4(c) are time charts for explaining an operation of an important part of the instruction unit.

FIG. 3 is a flow chart for explaining an operation of an important part of the instruction unit 21, and FIGS. 4(*a*) through 4(*c*) are time charts for explaining an operation of an important part of the instruction unit 21.

In FIG. 3, when the instruction decoder 5 decodes the branch instruction, a step S1 decides whether or not flags +D0_BRHIS_HIT through +D3_BRHIS_HIT which are set in the instruction word registers IRW0 through TWR3 of the instruction decoder 5 and become "1" when the instruction predicts a branch, are "1". If the flags +D0_BRHIS_HIT through +D3_BRHIS_HIT are "1" and the decision result in the step S1 is YES, the process advances to a step S4 which will be described later. On the other hand, the process advances to a step S2 if the decision result in the step S1 is NO. The step S2 decides whether the 29th bits +D0_OPC[29] through +D3_OPC[29] of the operation codes of the instruction set in the instruction word registers IWR0 through IWR3 are "0" or "1", so as to decide whether the annul bit is "0" or "1". If the annul bit is "1", the process advances to a step S3 which executes the instruction immediately after the branch as a NOP instruction, and the process advances to a step S5 which will be described later. On the other hand, if the annul bit is "0", the process advances to the step S4 which executes the instruction immediately after the branch, as is, and the process advances to the step S5. The steps S1 through S4 correspond to the interval D in which the decoding is carried out.

The step S5 decides whether or not the branch prediction is correct, so as to decide whether or not an instruction refetch is required. If the branch prediction is correct and the decision result in the step S5 is NO, the subsequent instruction is executed. On the other hand, if the branch prediction is incorrect and the decision result in the step S5 is YES, the process advances to a step S6. The step S6 makes an instruction refetch request to the instruction fetch part 2. A step S7 reinserts (sets) the delay slot instruction from the delay slot stack section 8 in the instruction pipeline. In addition, a step S8 inserts (issues) the instruction at the correct branching destination in the executing pipeline, and executes the subsequent instruction.

FIG. 4(*a*) shows processes within the instruction decoder 5, FIG. 4(*c*) shows processes within the instruction fetch part 2, and FIG. 4(*c*) shows processes within the delay slot stack section 8. In the case shown in FIGS. 4(*a*) through 4(*c*), the branch instruction is issued in an interval D shown in FIG. 4(*a*), and the judgement on the branch and the instruction refetch request corresponding to the steps S5 and S6 are made in subsequent intervals. The instruction refetch is started in an interval IA shown in FIG. 4(*b*), and the setting of the delay slot instruction and the issuance of the delay slot instruction corresponding to the steps S7 and S8 are made in intervals E and D shown in FIG. 4(*c*). In addition, an instruction fetch is completed in an interval IR shown in FIG. 4(*b*).

Figure 5:
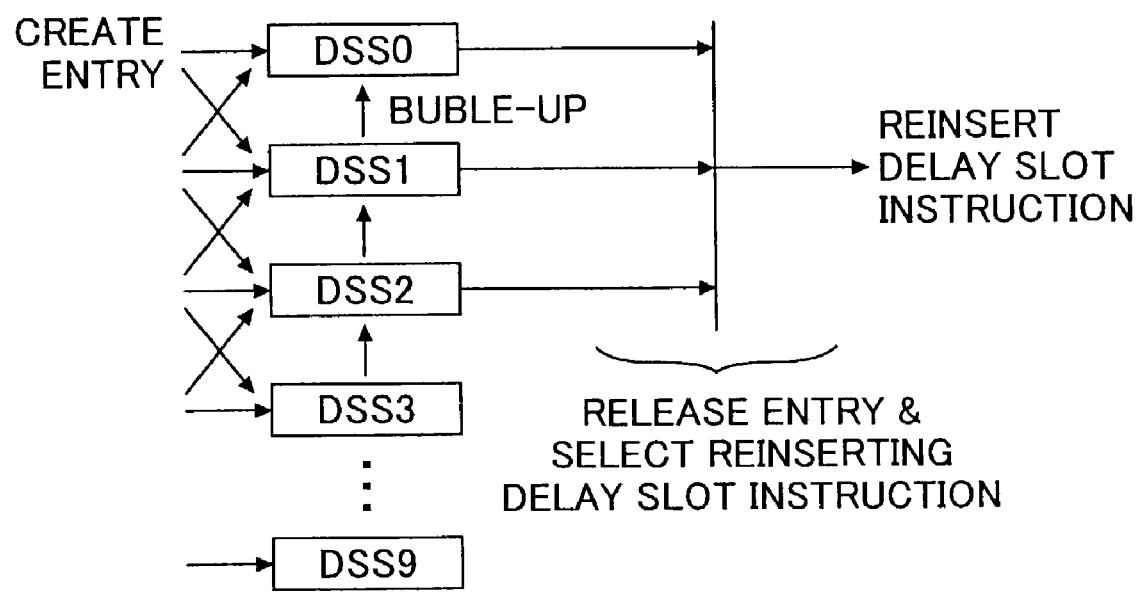
FIG. 5 is a diagram for explaining an operation of a delay slop stack section.

FIG. 5 is a diagram for explaining an operation of the delay slot stack section 8. For the sake of convenience, FIG. 5 shows a case where n=9, that is, the number of entries is ten. The delay slot stack section 8 has a stack structure for temporarily holding the delay slot instruction until the control of the branch instruction ends. When the branch instruction is decoded in the instruction decoder 5, a flag +D_DELAY_SLOT which indicates that the instruction is a delay slot instruction is added to an immediately subsequent instruction. In the branch instruction controller 7, if the instruction is issued, that is, if a signal +D_REL which becomes "1" when the instruction set in the corresponding instruction word register is issued is "1", an entry is created in the delay slot stack section 8 if the flag +D_DELAY_SLOT is "1".

Figure 6:
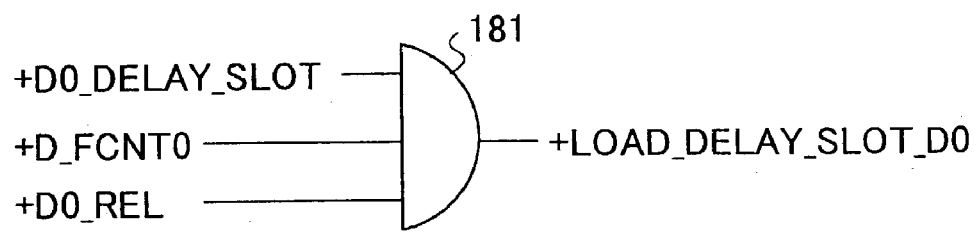
FIG. 6 is a circuit diagram showing a circuit structure within the delay slot stack section.

FIG. 6 is a circuit diagram showing a circuit structure within the delay slot stack section 8 for generating a signal +LOAD_DELAY_SLOT_D0 which indicates loading of an entry to the delay slot stack section 8, with respect to D0. The circuit structures for D1 through D3 are the same as the circuit structure for D0, and an illustration and description thereof will be omitted. In FIG. 6, the flag +D0_DELAY_SLOT and signals +DFCNT0 and +D0_REL obtained from the instruction decoder 5 are input to an AND circuit 181. The flag +D0_DELAY_SLOT indicates that the instruction is a delay slot instruction, the signal +DFCNT0 indicates a first flow of the instruction when issuing the instruction, and the signal +D0_REL becomes "1" when the instruction set in the instruction word register IWR0 is issued. The AND circuit 181 generates the signal +LOAD_DELAY_SLOT_D0 based on the flag +D0_DELAY SLOT and the signals +DFCNT0 and +D0_REL.

Figure 7:
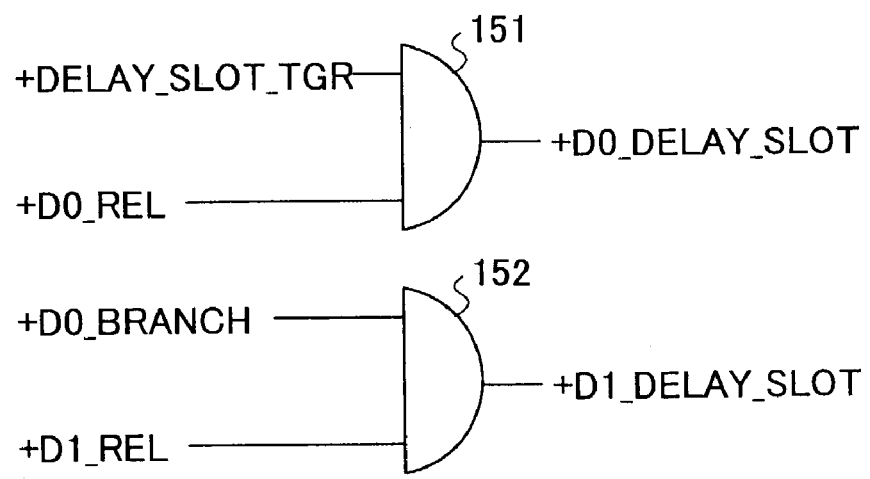
FIG. 7 is a circuit diagram showing a circuit structure within an instruction decoder.

FIG. 7 is a circuit diagram showing a circuit structure within the instruction decoder 5 for generating the flags +D0_DELAY_SLOT and +D1_DELAY_SLOT, with respect to D0 and D1. The circuit structures for D2 and D3 are the same as the circuit structure for D0 and D1, and an illustration and description thereof will be omitted. In FIG. 7, an AND circuit 151 generates the flag +D0_DELAY_SLOT which is supplied to the delay slot stack section 8, based on signals +DELAY_SLOT_TGR and +D0_REL. In addition, an AND circuit 152 generates the flag +D1_DELAY_SLOT which is supplied to the delay slot stack section 8, based on signals +D0_BRANCH and +D1_REL. The signal +DELAY_SLOT_TGR indicates that the instruction set in the instruction word register IWR0 is a delay slot instruction. The signal +D0_REL becomes "1" when the instruction set in the instruction word register IWR0 is issued. These signals +DELAY_SLOT_TGR and +D0_REL are generated within the instruction decoder 5. The signal +D0_BRANCH indicates that the instruction set in the instruction word register is a branch instruction. The signal +D1_REL becomes "1", when the instruction set in the instruction word register IWR1 is issued.

The entry which is created in the delay slot stack section 8 has the following structure.

DSS_VALID,

OPC[31:0,P3:P0],

TID[5:0],

PC[31:0,P3:P0],

IF_XV,

IF XPTN CODE[1:0],

IF_ADRS_MATCH_VALID

DSS_VALID indicates a valid signal of the delay slot stack section 8 which is "1" when indicating a valid entry. OPC indicates an operation code of the delay slot instruction. IID indicates an instruction identification (ID) of the delay slot instruction, and is used as tag information which indicates a position of the delay slot instruction in the instruction sequence. PC indicates an instruction address of the instruction. IF XV indicates that an exception is generated when the instruction fetch is made with the address of a target instruction. IF_XPTN_CODE indicates a type of the instruction fetch exception indicated by IF_XV. IF_ADRS_MATCH_VALID indicates that an interrupt is generated at a specified address.

The entry of the delay slot stack section 8 is held until the control of the branch instruction (immediately preceding branch instruction) corresponding to the delay slot instruction ends. When the control of the corresponding branch instruction is completed, a signal +RSBR_COMPLETE becomes "1", and the entry is released, that is, the entry is erased. As will be described later, the signal +RSBR_COMPLETE becomes "1" when the control of the branch instruction at the corresponding position of the branch instruction controller 7 is completed.

When the judgement of the branch of the corresponding branch instruction is made and an instruction refetch is necessary as a result of the judgement, an instruction refetch request +RSBR_REIFCH_REQ=1 is output from the branch instruction controller 7 with respect to the instruction fetch part 2. If the instruction refetch becomes necessary, it becomes necessary to reexecute the delay slot instruction. When the instruction refetch request +RSBR_REIFCH_REQ becomes "1", a delay slot instruction reset request signal +SET_IWR0_DELAY_SLOT_VALID is set from the delay slot stack section 8 to the corresponding instruction word register IWR0 within the instruction decoder 5. The delay slot instruction reset request signal +SET_IWR0_DELAY_SLOT_VALID requests the delay slot instruction to be reinserted into the executing pipeline. The instruction is always supplied from the delay slot stack section 8 when the delay slot instruction reset request signal +SET IWR0_DELAY_SLOT_VALID is "1".

Figure 8:
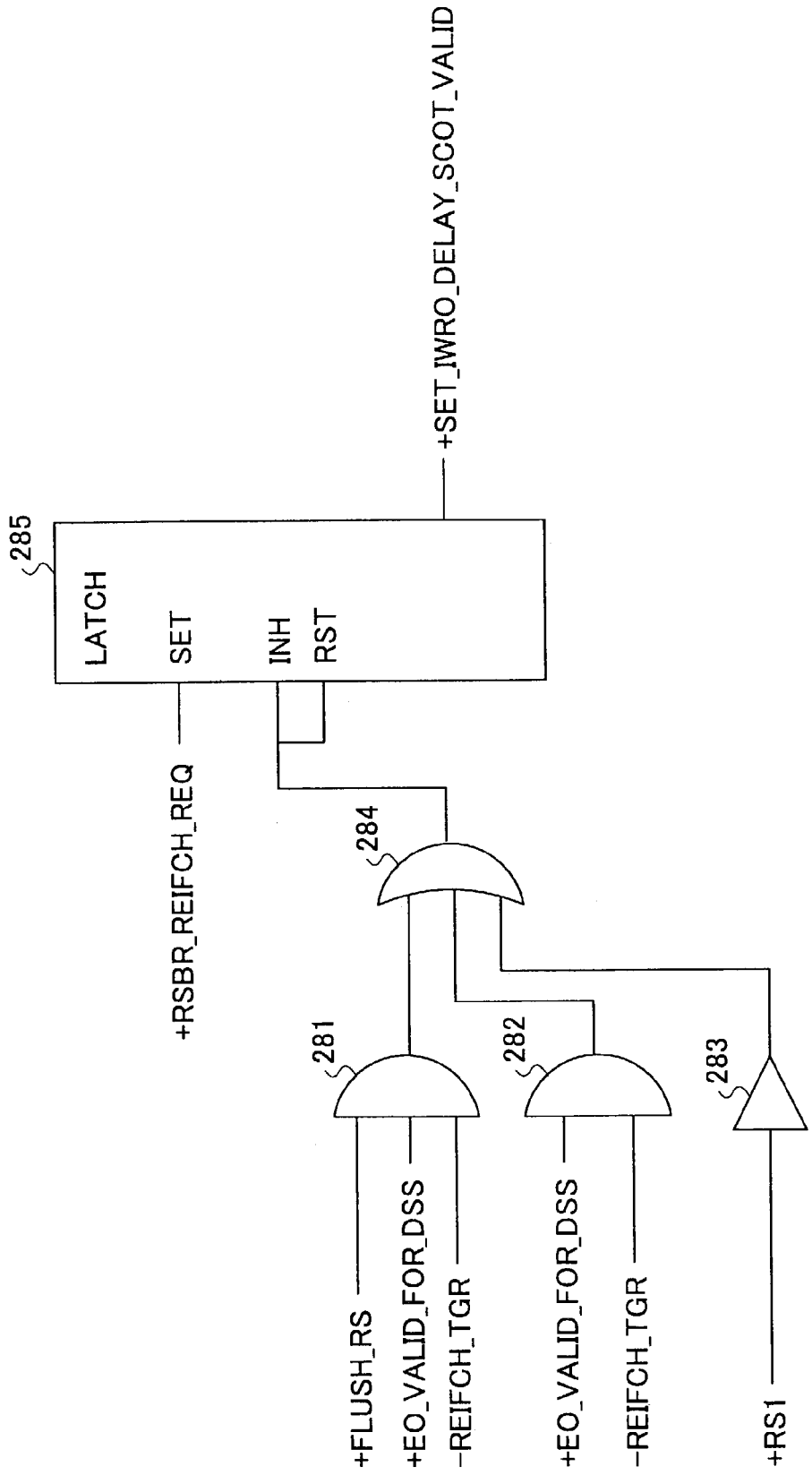
FIG. 8 is a circuit diagram showing a circuit structure within the delay slot stack section.

FIG. 8 is a circuit diagram showing a circuit structure within the delay slot stack section 8 for generating the delay slot instruction reset request signal +SET_IWR0_DELAY_SLOT_VALID. In FIG. 8, signals +FLUSH_RS, +E0VALID_FOR_DSS and +RE-IFCH_TGR are input to an AND circuit 281. The signal +FLUSH_RS becomes "1" when the branch instruction which made the instruction refetch request ends. The signal +E0VALID_FOR_DSS becomes "1" when the resetting of the instruction from the delay slot stack section 8 to the corresponding instruction word register IWR1 within the instruction decoder 5 is completed. The signal +RE-IFCH_TGR becomes "1" when the instruction refetch request is output from the branch instruction controller 7, and is reset to "0" when the signal +FLUSH_RS=1. The signals +E0_VALID_FOR_DSS and —REFCH_FGR are input to an AND circuit 282. A signal +RS1 is input to a buffer 283. The signal +RS1 becomes "1" when an interrupt process is generated. Outputs of the AND circuits 281 and 282 and an output of the buffer 283 are input to an OR circuit 284. An output of the OR circuit 284 is input to an input terminal INH and a reset terminal RST of a latch circuit 285. In addition, an instruction refetch request signal +RSBR_REIFCH_REQ is input to a set terminal SET of the latch circuit 285. The instruction refetch request signal +RSBR_REIFCH_REQ is output from the branch instruction controller 7 to the instruction fetch part 2. The delay slot instruction reset request signal +SET_IWR0_DELAY_SLOT_VALID is output from the latch circuit 285.

If the judgement is made on the branch and the instruction refetch request signal +RSBR_REIFCH_REQ becomes "1", the branch instruction sets a signal +RSBR_REIFCH_DONE to "1". The signal +RSBR_REIFCH_DONE indicates that the instruction made an instruction fetch request. When the control of the branch instruction ends, that is, when the signal +RSBR_COMPLETE=1 and the signal +RSBR_RE-IFCH_DONE=1, a corresponding instruction is selected by a circuit shown in FIG. 9, and temporarily held by a circuit shown in FIG. 10. It takes a minimum time of $3\tau$, for example, from a time when the signal +RSBR_REIFCH_REQ becomes "1" until a time when the delay slot instruction is issued, and the temporarily latched up data is supplied to the instruction decoder 5.

Figure 9:
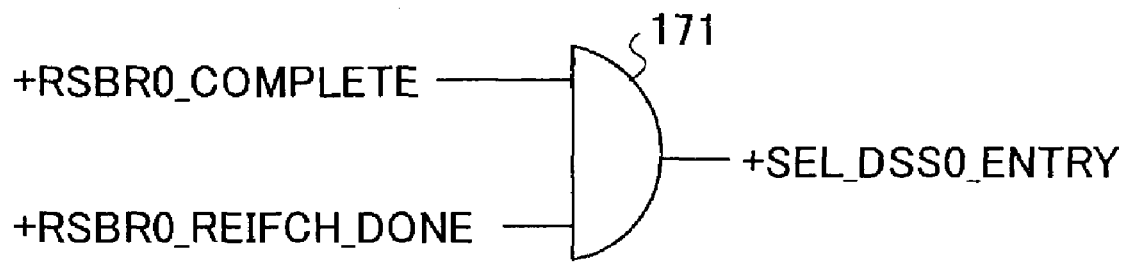
FIG. 9 is a circuit diagram showing a circuit structure within a branch instruction controller.

FIG. 9 is a circuit diagram showing a circuit structure within the branch instruction controller 7 for generating a signal +SEL_DSS0_ENTRY, with respect to the delay slot stack DSS0. The circuit structures for delay slot stacks DSS1 through DSS3 are the same as the circuit structure for the delay slot stack DSS0, and an illustration and description thereof will be omitted. In FIG. 9, signals +RSBR0_COMPLETE and +RSBR0_REIFCH_DONE are input to an AND circuit 171, and the signal +SEL_DSS0_ENTRY is output from the AND circuit 171. The signal +RSBR0_COMPLETE becomes "1" when the control of the 0th branch instruction of the branch instruction controller 7 is completed. The signal +RSBR0_REIFCH_DONE becomes "1" when the 0th branch instruction of the branch instruction controller 7 outputs an instruction refetch request. The signal +SEL_DSS0_ENTRY becomes "1" when it becomes necessary to reset the instruction word register IWR0 from the 0th delay slot stack DSS0 of the delay slot stack section 8.

Figure 10:
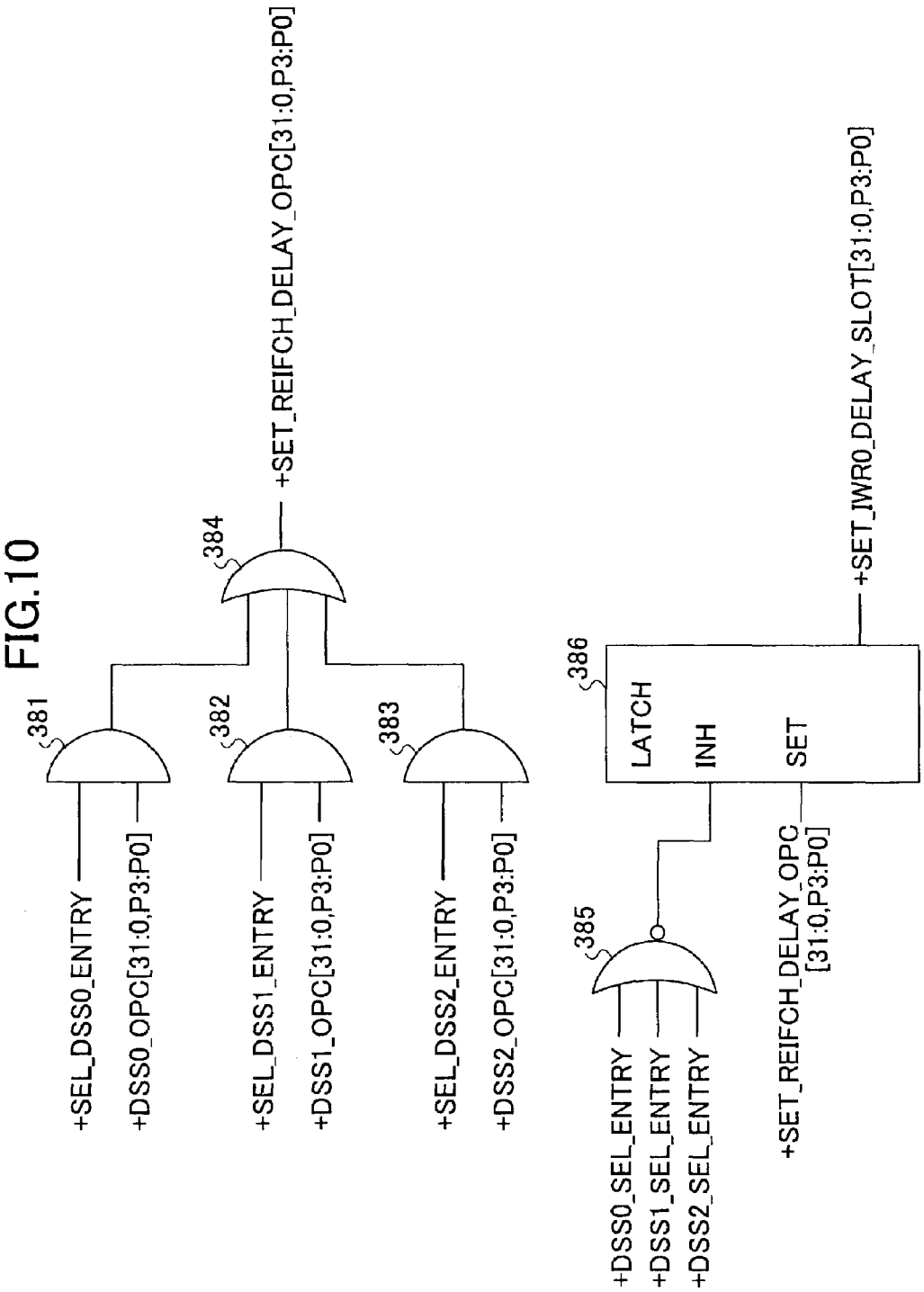
FIG. 10 is a circuit diagram showing a circuit structure within the delay slot stack section.

FIG. 10 is a circuit diagram showing a circuit structure within the delay slot stack section 8 for generating signals +SET_REIFCH_DELAY_OPC[31:0,P3:P0] and +SET_ IWR0_DELAY_SLOT[31:0,P3:P0]. In FIG. 10, signals +SEL_DSS0_ENTRY and +DSS0_OPC[31:0,P3:P0] are input to an AND circuit 381, signals +SEL_DSS1_ENTRY and +DSS1_OPC[31:0,P3:P0] are input to an AND circuit 382, and signals +SEL_DSS2_ENTRY and +DSS2_OPC[31:0,P3:P0] are input to an AND circuit 383. Outputs of the AND circuits 381 through 383 are input to an OR circuit 384, and a signal +SET_REIFCH_DELAY_OPC[31:0,P3:P0] is output from the OR circuit 384.

The signal +SEL_DSSO_ENTRY becomes "1" when it becomes necessary to reset the instruction word register TWRO from the 0th delay slot stack DSSO of the delay slot stack section 8, and the signal +DSS0_OPC[31:0,P3:P0] is the operation code stored at the 0th entry of the delay slot stack section 8. The signal +SEL_DSS1_ENTRY becomes "1" when it becomes necessary to reset the instruction word register IWR1 from the 1st delay slot stack DSS1 of the delay slot stack section 8, and the signal +DSS1_OPC[31:0,P3:P0] is the operation code stored at the 1st entry of the delay slot stack section 8. The signal +SEL_DSS2_ENTRY becomes "1" when it becomes necessary to reset the instruction word register IWR2 from the 2nd delay slot stack DSS2 of the delay slot stack section 8, and the signal +DSS2_OPC[31:0,P3:P0] is the operation code stored at the 2nd entry of the delay slot stack section 8. The signal +SET_REIFCH_DELAY_OPC [31:0,P3:P0] is the operation code which is to be set when resetting the delay slot instruction to the instruction word register IWR0 from the delay slot stack section 8.

The signals +SEL_DSSO_ENTRY, +SEL_DSS1_ENTRY and +SEL_DSS2_ENTRY are input to a NOR circuit 385 shown in FIG. 10, and an output of the NOR circuit 385 is input to an input terminal INH of a latch circuit 386. The signal +SET_REIFCH_DELAY_OPC[31:0,P3:P0] is input to a set terminal SET of the latch circuit 386. The latch circuit 386 outputs a signal +SET_IWR0_DELAY_SLOT[31:0.P3:P0]. The signal +SET_IWR0_DELAY SLOT[31:0.P3:P0] is the operation code which is to be set when resetting the delay slot instruction from the delay slot stack section 8 to the instruction word register IWR0. This operation code is reset in the instruction word register IWR0 when the signal +SET_IWR0_DELAY_SLOT_VALID output by the circuit shown in FIG. 8 is "1".

Signals PC[31:0,P3:P0], IF_XV, IF_XPTN_CODE[1:0] and E0_NOP (select RSBR_DELAY_SLOT_ANNULLED) may be generated using logic circuits similar to those described above, and an illustration and description thereof will be omitted.

When the judgement on the branch becomes definite, whether or not the delay slot instruction is executed then becomes definite. In a case where the branch prediction becomes true, the delay slot instruction is not reinserted into the executing pipeline, but in a case where the branch prediction fails, it is necessary to judge gain whether or not the delay slot instruction is executed. In this embodiment, the operation code of the selected delay slot is inserted as is when executing the delay slot instruction. But when the delay slot instruction is not executed, the operation code is changed to a NOP instruction, and thereafter, the instruction is supplied to the instruction decoder 5 together with the flag +E0_NOP=L which indicates that the delay slot instruction is treated as a NOP instruction. When not executing the delay slot instruction, the signals +IF_XV, +TF_ADRS_MATCH_VALID are constantly "0".

Figure 11:
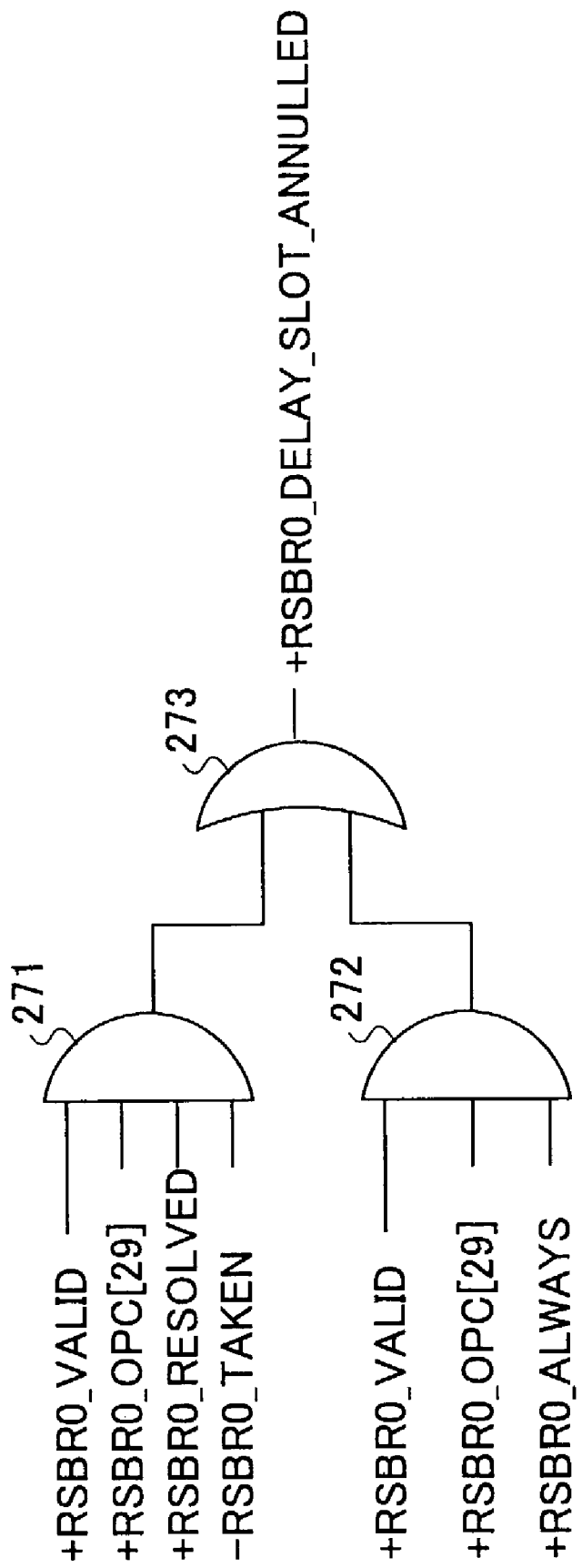
FIG. 11 is a circuit diagram showing a circuit structure within the branch instruction controller.

FIG. 11 is a circuit diagram showing a circuit structure within the branch instruction controller 7 for generating a signal +RSBR0_DELAY_SLOT_ANNULLED, with respect to the reservation station for branch RSBR0. The circuit structures for reservation stations for branch RSBR1 through RSBR3 are the same as the circuit structure for the reservation station for branch RSBR0, and an illustration and description thereof will be omitted. In FIG. 11, signals +RSBR0_VALID, +RSBR0_OPC[29], +RSBR0_RESOLVED and +RSBR0_TAKtN are input to an AND circuit 271, and signals +RSBR0_VALID, +RSBR0_OPC[29] and +RSBR0_ALWAYS are input to an AND circuit 272. An entry is created in the branch instruction controller 7 when a branch instruction is issued. The signal +RSBR0_VALID indicates that the 0th entry of the branch instruction controller 7 is valid. The signal +RSBR0_OPC[29] indicates a 0th invalid field of the branch instruction controller 7. The signal +RSBR0_RESOLVED becomes "1" when the 0th judgement on the branch of the branch instruction controller 7 is completed. The signal +RSBR0_TAKEN becomes "1" when the branching of the 0th branch instruction of the branch instruction controller 7 becomes definite. The signal +RSBR0_ALWAYS indicates that the 0th branch instruction of the branch instruction controller 7 is a relative branch instruction and is an unconditional branch. Outputs of the AND circuits 271 and 272 are input to an OR circuit 273, and a signal +RSBR0_DELAY_SLOT_ANNULLED is output from the OR circuit 273. The signal +RSBR0_DELAY_SLOT_ANNULLED indicates that a delay slot instruction corresponding to the 0th branch instruction of the branch instruction controller 7 is invalidated.

Figure 12:
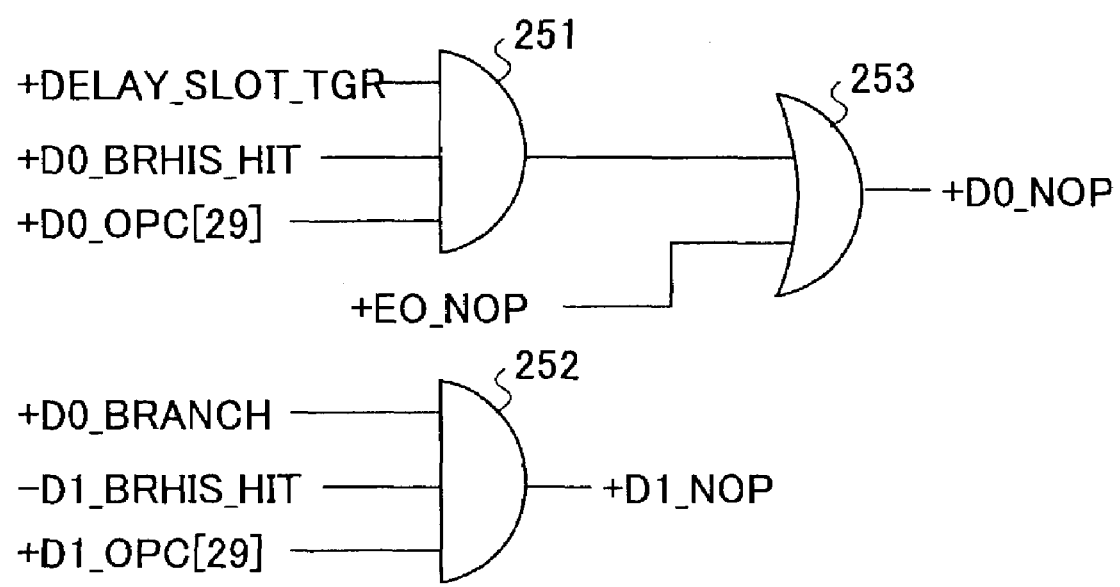
FIG. 12 is a circuit diagram showing a circuit structure within an instruction decoder.

FIG. 12 is a circuit diagram showing a circuit structure within the instruction decoder 5 for generating signals +D0_NOP and +D1_NOP, with respect to D0 and D1. The circuit structures for D2 and D3 are the same as the circuit structure for D0 and D1, and an illustration and description thereof will be omitted. In FIG. 12, a flag +DELAY_SLOT_FGR and signals −D0_BRHIS_HIT and +D0_OPC [29] are input to an AND circuit 251, and signals +D0_BRANCH, −D1_BRHIS_HIT and +D1_OPC[29] are input to an AND circuit 252. The flag +DELAY_SLOT_FGR indicates that the instruction set in the instruction word register IWR0 is a delay slot instruction. The signal −D0_BRHIS_HIT becomes "1" when it is predicted that the instruction set in the instruction word register IWR0 will branch. The signal +D0_OPC[29] indicates the 29th bit of the operation code of the instruction set in the instruction word register IWR0. The signal +D0_BRANCH indicates that the instruction set in the instruction word register IWR0 is a branch instruction. The signal −D1_BRHIS_HIT becomes "1" when it is predicted that the instruction set in the instruction word register IWR1 will branch. The signal +D1_OPC [29] indicates the 29th bit of the operation code of the instruction set in the instruction word register IWR1.

An output of the AND circuit 251 and a flag +E0_NOP are input to an OR circuit 253. On the other hand, the AND circuit 252 outputs a signal +D1_NOP. The flag +E0_NOP indicates that the delay slot instruction is not executed. The signal +D0_NOP becomes "1" when the instruction set in the instruction word register IWR0 is changed to a NOP instruction. The signal +D1_NOP becomes "1" when the instruction set in the instruction word register TWR1 is changed to a NOP instruction.

Therefore, this embodiments adds the flag +D_DELAY_SLOT to all of the instructions during the decode cycle D, for the purpose of distinguishing the delay slot instruction. If the flag +D_DELAY_SLOT is "1", it is indicated that the instruction is a delay slot instruction. On the other hand, if the flag +D_DELAY_SLOT is "0", it is indicated that the instruction is not a delay slot instruction. When the delay slot instruction having the flag +D_DELAY_SLOT which is "1" is issued, an entry is created in the delay slot stack section 8. Further, when the branch instruction is decoded in the instruction decoder 5, the flag +D_DELAY_SLOT of the immediately subsequent instruction becomes "1".

In addition, the flag +D_NOP is added to all of the instructions during the decode cycle D, for the purpose of indicating the execution or non-execution of the delay slot instruction. When the flag +D_NOP is "1", it is indicated that the instruction is not executed. On the other hand, if the flag +D_NOP is "0", it is indicated that the instruction is executed. A flag +D_NOP=1 is added in the decode cycle D in a first case where −D_BRHIS_HIT=1, +D_BRANCH=1 and +OPC[29]=1 or, in a second case where +E0_NOP=1. The first case indicates a branch instruction for which no branch prediction is made (or for which no branching was predicted) with an invalid bit "1". This first case is equivalent to predicting that the delay slot instruction is not executed. The second case indicates failure of the branch prediction by the branch instruction and the need to make a reinsertion into the executing pipeline from the delay slot instruction, and the delay slot instruction is not executed in this case.

Because this embodiment provides a storage unit for storing a delay slot instruction corresponding to a branch instruction, an instruction refetch of the delay slot instruction is not made and only the instruction refetch at the branching destination is made if the branch prediction fails. For this reason, it is possible to recover the instruction refetch at a high speed. In addition, the delay slot instruction can be reissued while waiting for the data of the instruction refetch at the branching destination. Since the branch prediction predicts the execution or non-execution of the delay slot instruction, it is possible to execute the instruction at a high speed without introducing inconveniences when the branch prediction becomes true.

Further, the present invention is not limited to these embodiments, but various variations and modifications may be made without departing from the scope of the present invention.

What is claimed is

1. An instruction control method to be implemented in an instruction control unit of a processor, having a branch predictor and a storage unit, to process instructions by out-of-order processing and to use delay instructions for branching, comprising:

predicting by the branch predictor whether or not branch instructions are to branch;

successively storing a plurality of delay instructions in a storage unit together with information indicating whether or not branch instructions corresponding to the delay instructions are predicted to branch by the branch predictor; and temporarily replacing a delay instruction by a non-operation instruction when a corresponding branch instruction is predicted not to branch, said non-operation instruction being executed at a time when said delay instruction would have been executed and including tag data indicating only that the non-operation instruction replaces the delay instruction, the tag data thereby distinguishing said non-operation instruction from a normal non-operation instruction performing a function other than delay instruction replacement.

2. The instruction control method as claimed in claim 1, further comprising:

executing a delay instruction when a corresponding branch instruction is predicted to branch.

3. The instruction control method as claimed in claim 2, further comprising:

issuing an instruction at a predicted branching destination after issuing the delay instruction corresponding to the branch instruction which is predicted to branch, and issuing the non-operation instruction when the branch instruction is predicted not to branch and the delay instruction is temporarily replaced by the non-operation instruction.

4. The instruction control method as claimed in claim 1, further comprising:

registering in the storage unit a tag for indicating a position of an instruction in an instruction sequence when storing the instruction in the storage unit.

5. An instruction control method to be implemented in an instruction control unit of a processor, having a branch predictor and a storage unit, to process instructions by out-of-order processing and to use delay instructions for branching, comprising:

making branch predictions by the branch predictor to predict whether or not branch instructions are to branch;

issuing an instruction by reading a corresponding delay instruction from the storage unit together with an instruction fetch request at a branching destination in a case where branching of an immediately preceding branch instruction becomes definite after issuing an instruction by temporarily replacing a delay instruction by a non-operation instruction when a corresponding branch instruction is predicted not to branch, said non-operation instruction being executed at a time when said delay instruction would have been executed and including tag data indicating only that the non-operation instruction replaces the delay instruction, the tag data thereby distinguishing said non-operation instruction from a normal non-operation instruction performing a function other than delay instruction replacement; and continuing execution of the instruction if an instruction at the predicted branching destination is issued and the predicted branching destination is correct and making an instruction refetch request of a branching destination instruction after the delay instruction if predicted branching destination is incorrect, after the branch instruction is predicted to branch and the corresponding delay instruction is issued.

6. The instruction control method as claimed in claim 5, further comprising:

fetching an instruction of the branching destination immediately after the branching becomes definite when the branching becomes definite after no branching is predicted, and issuing the instruction at the branching destination after inserting the delay instruction read from the storage unit into an instruction sequence.

7. The instruction control method as claimed in claim 5, further comprising:

issuing the instruction at a correct branching destination after inserting the delay instruction into an instruction sequence by refetching an instruction of the correct branching destination immediately after the branching destination becomes definite, if the branching becomes definite after the branching is predicted and a predicted branching destination is in error.

8. An instruction control method to be implemented in an instruction control unit of a processor, having a branch predictor and a storage unit, to process instructions by out-of-order processing and to use delay instructions for branching, comprising:

making branch predictions by the branch predictor to predict whether or not branch instructions are to branch; and continuing execution of an instruction if a branch of an immediately preceding branch instruction that is predicted not to be taken is determined not to be taken and the instruction is issued by temporarily replacing a delay instruction by a non-operation instruction, said non-operation instruction being executed at a time when said delay instruction would have been executed and including tag data indicating only that the non-operation instruction replaces the delay instruction, the tag data thereby distinguishing said non-operation instruction from a normal non-operation instruction performing a function other than delay instruction replacement; and issuing the instruction immediately after a fetch is completed by making an instruction refetch request of an original sequential instruction if a branch of the branch instruction that is predicted to be taken is determined not to be taken.

9. The instruction control method as claimed in claim 8, further comprising:

simultaneously erasing from a storage unit the delay instruction and tag information which are stored in the storage unit, said tag information indicating a position of the delay instruction in an instruction sequence.

10. A processor which processes instructions by out-of-order processing and carries out an instruction control using delay instructions for branching, comprising:

a storage unit;

a branch predictor making branch predictions to predict whether or not branch instructions are to branch; and a control unit successively storing a plurality of delay instructions in the storage unit together with information indicating whether or not branch instructions corresponding to the delay instructions are predicted to branch by the branch predictor; and temporarily replacing a delay instruction by a non-operation instruction when a corresponding branch instruction is predicted not to branch, said non-operation instruction being executed at a time when said delay instruction would have been executed and including tag data indicating only that the non-operation instruction replaces the delay instruction, the tag data thereby distinguishing said non-operation instruction from a normal non-operation instruction performing a function other than delay instruction replacement.

11. The processor as claimed in claim 10, further comprising:
a part configured to execute a delay instruction when a corresponding branch instruction is predicted to branch, and temporarily replacing a delay instruction by a non-operation instruction when a corresponding branch instruction is predicted not to branch.

12. The processor as claimed in claim 11, further comprising:
a part configured to issue an instruction at a predicted branching destination after issuing the delay instruction corresponding to the branch instruction which is predicted to branch, and to issue the non-operation instruction when the branch instruction is predicted not to branch and the delay instruction is temporarily replaced by the non-operation instruction.

13. The processor as claimed in claim 10, further comprising:
a part configured to register in the storage unit a tag for indicating a position of an instruction in an instruction sequence when storing the instruction in the storage unit.

14. A processor which processes instructions by out-of-order processing and carries out an instruction control using delay instructions for branching, comprising:
a storage unit;
a branch predictor making branch predictions to predict whether or not branch instructions are to branch; and
a control unit issuing an instruction by reading a corresponding delay instruction from the storage unit together with an instruction fetch request at a branching destination in a case where branching of an immediately preceding branch instruction becomes definite after issuing an instruction by temporarily replacing a delay instruction by a non-operation instruction when a corresponding branch instruction is predicted not to branch, and continuing execution of the instruction if an instruction at the predicted branching destination is issued and the predicted branching destination is correct and making an instruction refetch request of a branching destination instruction after the delay instruction if predicted branching destination is incorrect, after the branch instruction is predicted to branch and the corresponding delay instruction is issued, said non-operation instruction being executed at a time when said delay instruction would have been executed and including tag data indicating only that the non-operation instruction replaces the delay instruction, the tag data thereby distinguishing said non-operation instruction from a normal non-operation instruction performing a function other than delay instruction replacement.

15. The processor as claimed in claim 14, further comprising:
part configured to fetch an instruction of the branching destination immediately after the branching becomes definite when the branching becomes definite after no branching is predicted, and issuing the instruction at the branching destination after inserting the delay instruction read from the storage unit into an instruction sequence.

16. The processor as claimed in claim 14, further comprising:
a part configured to issue the instruction at a correct branching destination after inserting the delay instruction into an instruction sequence by refetching an instruction of the correct branching destination immediately after the branching destination becomes definite, if the branching becomes definite after the branching is predicted and a predicted branching destination is in error.

17. A processor which processes instructions by out-of-order processing and carries out an instruction control using delay instructions for branching, comprising:
a branch predictor making branch predictions to predict whether or not branch instructions are to branch; and
a control unit continuing execution of an instruction if a branch of an immediately preceding branch instruction that is predicted not to be taken is determined not to be taken and the instruction is issued by temporarily replacing a delay instruction by a non-operation instruction, and issuing the instruction immediately after a fetch is completed by making an instruction refetch request of an original sequential instruction a branch of the branch instruction that is predicted to be taken is determined not to be taken, said non-operation instruction being executed at a time when said delay instruction would have been executed and including tag data indicating only that the non-operation instruction replaces the delay instruction, the tag data thereby distinguishing said non-operation instruction from a normal non-operation instruction performing a function other than delay instruction replacement.

18. The processor of claim 17, further comprising:
a branch instruction executing part including a delay slot stack section.

19. The processor as claimed in claim 17, further comprising:
storage unit; and
a part configured to simultaneously erase from the storage unit the delay instruction and tag information which are stored in the storage unit, said tag information indicating a position of the delay instruction in an instruction sequence.

20. An instruction control method, comprising:
storing a combination of data including at least one delay instruction and data indicating whether a branch instruction corresponding to the at least one delay instruction is predicted to branch;
performing an instruction refetch at a branching destination when a branch prediction fails; and
temporarily replacing a delay instruction by a non-operation instruction when a corresponding branch instruction is predicted not to branch, said non-operation instruction being executed at a time when said delay instruction would have been executed and including tag data indicating only that the non-operation instruction replaces the delay instruction, the tag data thereby distinguishing said non-operation instruction from a normal non-operation instruction performing a function other than delay instruction replacement.

21. An instruction control method, comprising:
predicting whether branching will occur; and
temporarily replacing a delay instruction by a non-operation instruction when a corresponding branch instruction is predicted not to branch, said non-operation instruction being executed at a time when said delay instruction would have been executed and including tag data indicating only that the non-operation instruction replaces the delay instruction, the tag data thereby distinguishing said non-operation instruction from a normal non-operation instruction performing a function other than delay instruction replacement.

22. The processor of claim 18, wherein said delay slot stack section includes a plurality of delay slot stacks.

23. An instruction control method to be implemented in an instruction control unit of a processor, having a branch predictor and a storage unit, to process instructions by out-of-order processing and to use delay instructions for branching, comprising:

predicting whether branch instructions are to branch; and temporarily replacing a delay instruction by a non-operation instruction when a corresponding branch instruction is predicted not to branch, said non-operation instruction being executed at a time when said delay instruction would have been executed and including tag data indicating only that the non-operation instruction replaces the delay instruction, the tag data thereby distinguishing said non-operation instruction from a normal non-operation instruction performing a function other than delay instruction replacement.

* * * * *

UNITED STATES PATENT AND TRADEMARK OFFICE
CERTIFICATE OF CORRECTION

| | |
|---|---|
| PATENT NO. | : 7,603,545 B2 |
| APPLICATION NO. | : 10/345296 |
| DATED | : October 13, 2009 |
| INVENTOR(S) | : Ryuichi Sunayama et al. |

It is certified that error appears in the above-identified patent and that said Letters Patent is hereby corrected as shown below:

Column 17, Line 11, change "and temporarily replacing" to --and to temporarily replace--.

Column 17, Line 62, change "and issuing" to --and to issue--.

Column 18, Line 36, change "storage" to --a storage--.

Signed and Sealed this

Twelfth Day of January, 2010

David J. Kappos
*Director of the United States Patent and Trademark Office*